United States Patent
Buerkle et al.

(10) Patent No.: US 11,623,622 B2
(45) Date of Patent: Apr. 11, 2023

(54) SYSTEM AND METHOD FOR EMERGENCY BRAKING

(71) Applicant: Intel Corporation, Santa Clara, CA (US)

(72) Inventors: Cornelius Buerkle, Karlsruhe (DE);
Julio Jarquin Arroyo, Karlsruhe (DE);
Fabian Oboril, Karlsruhe (DE);
Florian Geissler, Munich (DE);
Kay-Ulrich Scholl, Malsch (DE);
Ignacio Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 16/728,007

(22) Filed: Dec. 27, 2019

(65) Prior Publication Data
US 2020/0130662 A1    Apr. 30, 2020

(51) Int. Cl.
| | | |
|---|---|---|
| B60T 8/00 | (2006.01) | |
| B60T 8/32 | (2006.01) | |
| B60T 7/12 | (2006.01) | |
| B60W 10/18 | (2012.01) | |
| B60W 30/16 | (2020.01) | |

(52) U.S. Cl.
CPC .............. B60T 8/321 (2013.01); B60T 7/12 (2013.01); B60W 10/18 (2013.01); *B60T 2201/02* (2013.01); *B60T 2210/10* (2013.01); *B60W 30/16* (2013.01)

(58) Field of Classification Search
CPC ....... B60W 10/18; B60W 30/16; B60T 8/321; B60T 7/12; B60T 2201/02; B60T 2210/10
See application file for complete search history.

(56) References Cited

U.S. PATENT DOCUMENTS

| | | | |
|---|---|---|---|
| 2014/0032094 A1* | 1/2014 | Heinrichs-Bartscher | ................... B60T 7/22 701/301 |
| 2015/0151725 A1* | 6/2015 | Clarke | .................. B60W 10/18 701/28 |
| 2017/0072921 A1* | 3/2017 | Amato | ...................... B60T 7/22 |
| 2017/0361796 A1* | 12/2017 | Kim | .................... B60W 10/184 |
| 2019/0106108 A1* | 4/2019 | Wienecke | ............. B60W 10/18 |
| 2019/0291726 A1 | 9/2019 | Shalev-Shwartz et al. | |
| 2019/0291728 A1 | 9/2019 | Shalev-Shwartz et al. | |

OTHER PUBLICATIONS

Shalev-Shwartz et al.; On a Formal Model of Safe and Scalable Self-driving Cars; retrieved from: arXiv:1708.06374v6 [cs.RO]; Oct. 27, 2018; Cornell University; Oct. 27, 2018; 37 pages.

(Continued)

*Primary Examiner* — Truc M Do
(74) *Attorney, Agent, or Firm* — Viering, Jentschura & Partners mbB

(57) ABSTRACT

Aspects concern a method for controlling a braking of a vehicle. The method including detecting a braking situation, determining a classification of the braking situation, selecting a braking profile based on the determined classification, and applying a deceleration based on the selected braking profile to maintain a safety distance based on the selected braking profile.

19 Claims, 11 Drawing Sheets

(56) References Cited

OTHER PUBLICATIONS

Alipour-Fanid et al.; String Stability Analysis of Cooperative Adaptive Cruise Control Under Jamming Attacks; Conference: 2017 IEEE 18th International Symposium on High Assurance Systems Engineering (HASE); Jan. 2017; 6 pages.

Kalra et al.; How Many Miles of Driving Would It Take to Demonstrate Autonomous Vehicle Reliability?; Rand Corporation; 2016; 15 pages.

Greibe.; Braking distance, friction and behaviour; Trafitec; Jul. 2007; 85 pages.

* cited by examiner

SYSTEM AND METHOD FOR EMERGENCY BRAKING

TECHNICAL FIELD

Various aspects of this disclosure generally relate to autonomous driving, and more particularly, to a detection and handling mechanism for extreme emergency braking.

BACKGROUND

Advancements in autonomous vehicle operation continue to be developed and released. In the future, fully autonomous vehicles may be operating on open roads. Such autonomous vehicles may interact with conventional human-operated vehicles. Developers are designing autonomous vehicle operation to operate in a manner that is at least as safe as human-operated ones.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

This disclosure describes a system and a method for controlling a braking of a vehicle.

According to various embodiments, a method for a safety system of a vehicle may include controlling a braking of a vehicle by detecting a braking situation, determining a classification of the braking situation, selecting a braking profile based on the determined classification, and applying a deceleration based on the selected braking profile to maintain a safety distance based on the selected braking profile.

According to various embodiments, a system for a safety system of a vehicle may may control a braking of a vehicle and include one or more sensors configured to detect a braking situation, one or more processors configured to determine a classification of the braking situation, select a braking profile based on the determined classification, and apply a deceleration based on the selected braking profile to maintain a safety distance based on the selected braking profile.

To the accomplishment of the foregoing and related ends, the one or more aspects include the features hereinafter fully described and particularly pointed out in the claims. The following description and the associated drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The invention will be better understood with reference to the detailed description when considered in conjunction with the non-limiting examples and the accompanying drawings.

It should be noted that like reference numbers are used to depict the same or similar elements, features, and structures throughout the drawings.

DETAILED DESCRIPTION

Figure 1:
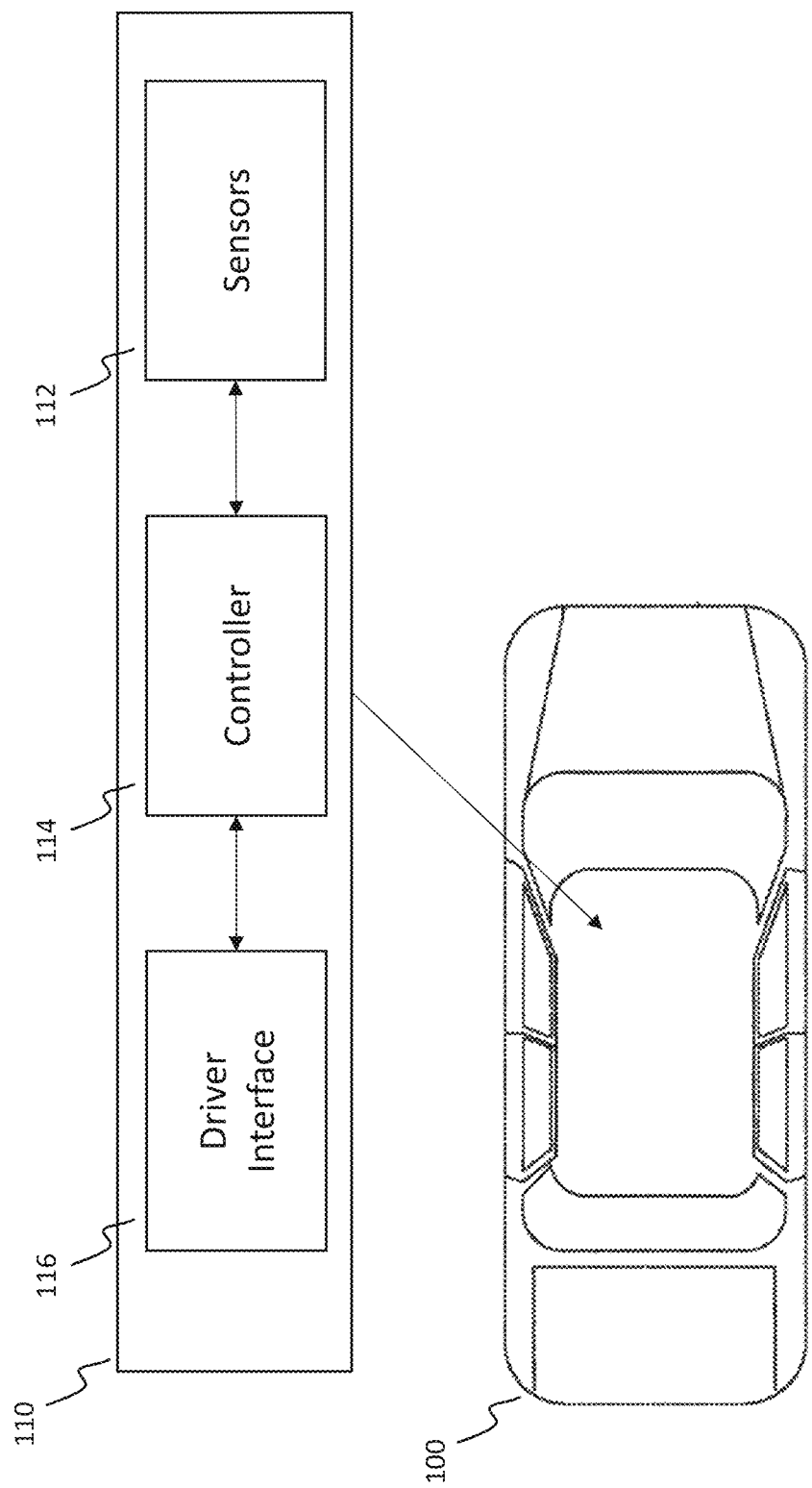
FIG. 1 is a schematic drawing illustrating a control system of an autonomous vehicle according to various aspects of this disclosure.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the systems or methods are analogously valid for the other systems or methods. Similarly, embodiments described in the context of a system are analogously valid for a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "exemplary" is used herein to mean "serving as an example, instance, or illustration." Any embodiment or design described herein as "exemplary" is not necessarily to be construed as preferred or advantageous over other embodiments or designs In the context of various embodiments, the articles "a", "an", and "the" as used with regard to a feature or element include a reference to one or more of the features or elements.

As used herein, the term "and/or" includes any and all combinations of one or more of the associated listed items.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

A "vehicle" is to be understood any type of driving object and may include automobiles, busses, mini busses, vans, trucks, mobile homes, vehicle trailers, motorcycles, bicycles, tricycles, moving robots, personal transporters; it should also be understood the visual odometry device disclosed applies to vehicles of any size and type. A vehicle may include an acceleration system and a braking system.

The term "autonomous vehicle" refers to a vehicle capable of implementing at least one navigational change without driver input. A navigational change refers to a change in one or more of steering, braking, or acceleration/deceleration of the vehicle. To be autonomous, a vehicle need not be fully automatic (for example fully operational without driver or without driver input). An autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or breaking under certain circumstances). In some aspects, autonomous vehicles may handle some or all aspects of braking, speed control, and/or a steering of the vehicle.

Autonomous vehicles (AVs) are capable of operating with or without human assistance. AVs may operate in a fully-autonomous mode or a partially-autonomous mode. When in a partially-autonomous mode, the AV may provide some autonomous functionality, such as lane departure monitoring, speed control, collision avoidance, emergency braking, or the like while the human operator performs other aspects of driving, such as steering. An autonomous vehicle may include a braking system similar to a braking system of a conventional automobile. Such a braking system may include one or more processors controlling a disc-brake of each wheel of the automobile.

Driving policies are a major component of AV operation and are used to govern the operation of AV in various situations. A driving policy is one or more rules that are reduced to formulas, comparisons, statistical evaluations, or the like. A driving policy may be implemented through the use of a machine learning algorithm, a rule-based decision tree, or other heuristic constructs. The driving policy may be one of several policies used with the AV.

Driving policies may be used to control an AV in various situations. The driving policies act in stages: sense, plan, and act. First, environmental and contextual data is sensed. Then a plan is identified using various policies, rules, or other decision-making mechanisms. Finally, an action is invoked. The action may be an autonomous vehicle maneuver, such as a steering, a braking, or an acceleration action. Other actions are also included in the scope of available actions.

Autonomous driving is a safety critical application. There is a need for safety to be guaranteed in all situations. Recent studies have shown the infeasibility of verifying the correct behavior of an autonomous vehicle just by testing driving policies. To verify driving policies, an oversight safety driving model may be constructed to ensure that planned actions of driving policies comply with the safety driving model. The safety driving model is used to assure that when a driving policy misbehaves or does not address a particular situation, the safety driving model may provide a fallback policy to provide safe operation of autonomous vehicles. For example, a baseline safety driving model may be a safety layer, which is placed outside or around a driving policy to compensate for potential errors of the driving policy by restricting the AV from operating dangerously thereby preventing the AV from causing an accident.

The safety driving model framework provides a more consistent and universal approach by incorporating a sense of responsibility into the actions of the AV. The safety driving model framework includes a formal treatment of cautious driving so that the AV should never take an action that would be considered a substantial risk of imperiling the AV or any other road agent. The safety driving model framework provides an additional constraint to driving policies to help ensure that the AV does not take any actions that are deemed unsafe, e.g., those for which potential accident liability may attach to the AV. If the AV takes only actions that are safe and that are determined not to result in an accident of the AV arising from its own fault or responsibility, then desired levels of accident avoidance (e.g., fewer than 10-9 per hour of driving) may be achieved.

The safety driving model framework may include of a collection of mathematical formulas that when applied to an AV can validate its safe driving behavior. For example, the safety driving model provides a mathematical formula for determining a longitudinal safety distance in front of the AV. If an AV complies with the calculated safety distance at all moments, then a dangerous situation may be avoided and therefore any possibility that an accident is caused by a safety driving model compliant AV is greatly minimized. The maximum deceleration or braking acceleration of an AV is restricted by the safety driving model framework. This is desirable for normal driving situations, because if the difference between minimum and maximum deceleration or braking acceleration is too great, longer longitudinal safety distances would be required. Increasing the minimum deceleration or braking acceleration is not desirable, because this would force all vehicles to brake hard all the time.

The limitation on the maximum deceleration or braking acceleration of the AV imposed by a safety driving model framework has a dangerous draw back. For example, if a leading vehicle brakes with greater deceleration than anticipated by a following safety driving model compliant AV (e.g., because the leading vehicle hits or anticipates to hit a static obstacle or if another emergency situation occurs), the safety driving model compliant AV may only apply the safety driving model maximum deceleration or braking acceleration even if harder braking would have prevented a collision or at least reduce the impact of the collision. Accordingly, it is desirable to provide an extension to safety driving model framework that will temporarily allow the application of greater braking acceleration in emergency situations and thereby still guarantee safety in normal driving situations.

The present disclosure describes an improved safety driving model and associated rules to provide better planning and resulting actions. These advantages and others are described further herein.

FIG. 1 is a schematic illustration of an autonomous vehicle 100 including a control system 110. The autonomous vehicle 100 can be a fully autonomous vehicle or a semi-autonomous vehicle. The control system 110 is incorporated into the autonomous vehicle 100. The control system 110 includes sensors 112, a controller 114, and a vehicle interface 116.

The sensors 112 are installed in the autonomous vehicle 100 and are operatively coupled to provide input/output signaling to the controller 114. Sensors 112 are used to determine environmental information, road conditions, travel conditions, or the like. Examples of sensors include, but are not limited to microphones, cameras, radar sensors, LiDAR sensors, infrared distance measurement sensors, and ultrasonic distance measurement sensors. The sensors 112 may be an array of sensors arranged as a combination of forward, sideward, and rearward facing sensors. Forward-facing or front-facing is used in the present disclosure to refer to the primary direction of travel. In a conventional vehicle, the direction the seats are typically arranged to face the direction of travel when the transmission is set to drive, or the like. Rear-facing or rearward-facing is used in the present disclosure to refer the direction that is opposite to the forward-facing or front-facing direction. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors). Side-facing sensors may be used for collision avoidance.

Front-facing sensors include front-facing cameras that are generally aligned with the direction of travel. Front-facing cameras may have a relatively wide field of view, even up to 180-degrees. Rear-facing sensors include rear-facing cameras that are generally disposed at an angle (perhaps 60-degrees off center) to be used to detect traffic in adjacent traffic lanes. Rear-facing cameras may also have a relatively wide field of view, which may overlap the field of view of the front-facing camera. Side-facing sensors are those that are directed outward from the sides of the vehicle. Cameras may include an array of infrared and/or visible light cameras, able to focus at long-range or short-range with narrow or large fields of view.

Front-facing sensors may also include infrared or ultrasonic sensors that can be used to measure or determine a distance between the autonomous vehicle 100 and an object or another vehicle in front of the autonomous vehicle 100.

Sensors 112 may also include speed sensors (e.g., speedometer) that measure a speed of the autonomous vehicle 100. Sensors 112 may also include acceleration sensors (e.g., single or multi-axis accelerometers) that measure an acceleration of the autonomous vehicle 100 along one or more axes.

The autonomous vehicle (AV) 100, which may be referred to as an "ego vehicle" or "host vehicle" or "following vehicle", may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The AV 100 may be operable in a manual mode where a human operates the AV 100 conventionally using a vehicle interface 116. For example, a vehicle interface 116 may include pedals, steering wheel, and other controls. The AV 100 may also be operable in a fully autonomous mode, where the AV 100 operates without user intervention. In addition, the AV 100 may operate in a semi-autonomous mode, where the AV 100 controls many of the aspects of driving, but the driver may intervene or influence the operation using conventional (e.g., steering wheel) and non-conventional inputs (e.g., voice control).

Referring to FIG. 1, the controller 114 is communicatively coupled to sensors 112 and a driver interface 116. The controller 114 receives inputs from the sensors 112 and/or the driver interface 116 during operation of the autonomous vehicle 100. The controller 114 can then use the inputs to determine appropriate actions for the autonomous vehicle 100. The control system 110 may include one or more processors, one or more memories, and one or more communication interfaces (not shown).

The one or more processors may include an application processor, a safety model processor, an image processor, a communication processor, or any other suitable processing device.

The one or more memories may include any number of random access memories, read only memories, flash memories, disk drives, optical storage, tape storage, removable storage and other types of storage. Any of the processors disclosed herein may be configured to perform certain functions in accordance with program instructions which may be stored in a memory of the one or more memories. In other words, a memory of the one or more memories may store software that, when executed by the processor, controls the operation of the system (e.g., the safety driving model framework, image processing software). A memory of the one or more memories may include one or more databases (e.g., various safety driving and braking profiles).

The communication interfaces may be configured to different desired radio communication protocols or standards. For example, a first communication interface may be configured in accordance with a Short Range mobile radio communication standard such as e.g. Bluetooth, Zigbee, and the like. For another example, a second communication interface may be configured in accordance with a Medium and Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with 3GPP (3$^{rd}$ Generation Partnership Project) standards. A third communication interface may be configured in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like).

A conventional safety driving model framework may include a definition of what is considered a proper longitudinal safety distance between the following vehicle and the leading vehicle. The longitudinal safety distance is parametrized by maximum accelerations, minimum and maximum decelerations, a response time, and the current state of the environment, i.e. the traffic participants and their current physical states. For example, a minimum longitudinal safety distance $d_{min}$ may be calculated based on Eq. (1)

$$d_{min} = v_r\rho + \frac{1}{2}a_{max,accel}\rho^2 + \frac{(v_r + \rho a_{max,accel})^2}{2a_{min,brake}} - \frac{v_f^2}{2a_{max,brake}} \qquad \text{Eq. (1)}$$

where $v_r$ is the velocity of the following (rear) vehicle, $v_f$ is the velocity of the leading (front) vehicle, $\rho$ is the nominal response time of the following vehicle recognizing that the leading vehicle has changed acceleration, $a_{min,brake}$ is the minimum safety driving model deceleration or braking acceleration, $a_{max,brake}$ is the maximum safety driving model deceleration or braking acceleration, and $a_{max,accel}$ is the maximum safety driving model acceleration of the following (rear) vehicle. The maximum applied braking acceleration may be restricted or limited by the safety driving model framework.

Figure 3:
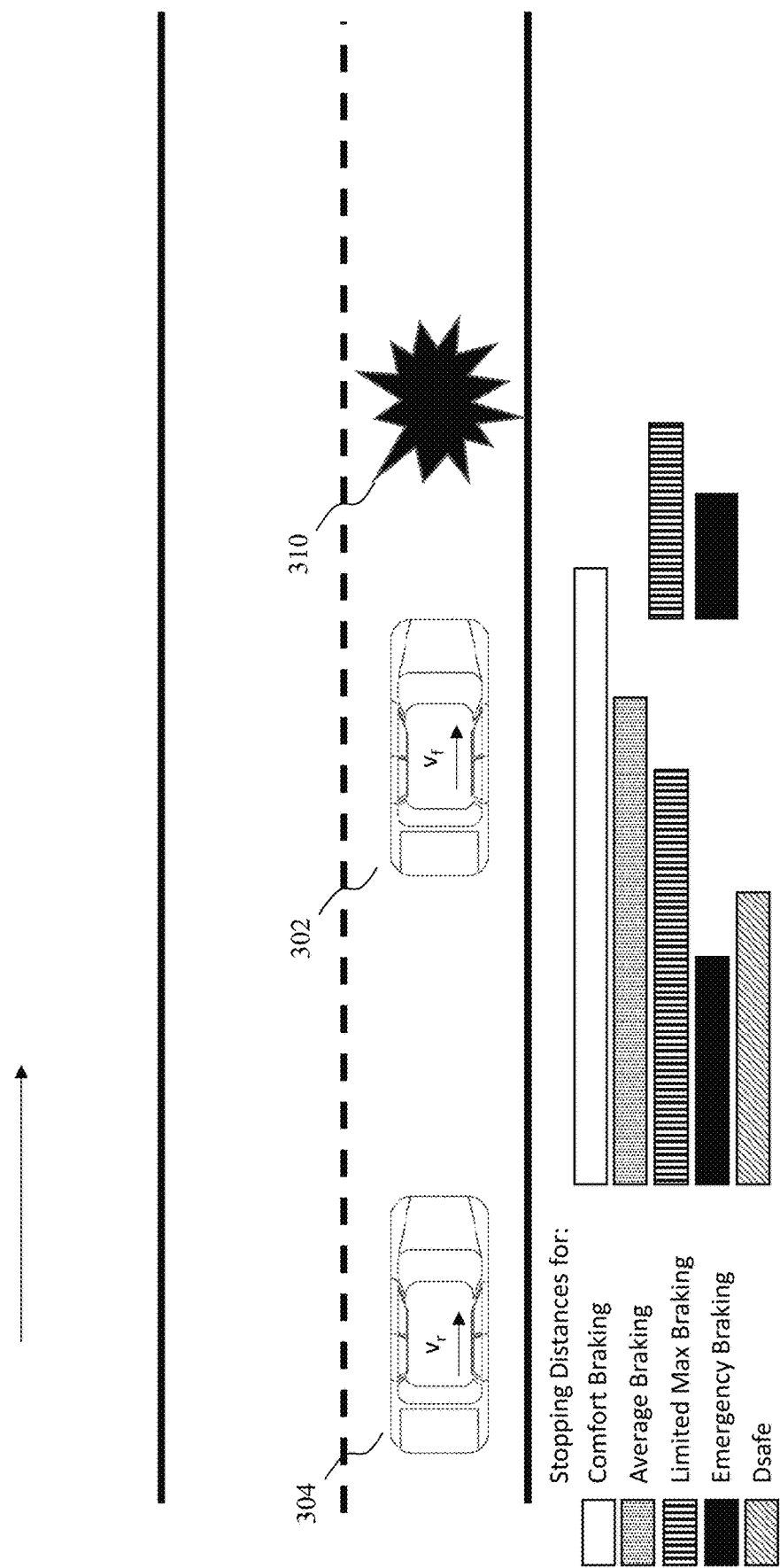
FIG. 3 illustrates an example of an accident resulting from a leading vehicle performing an emergency braking maneuver with a following vehicle crashing into the leading vehicle if emergency braking is not applied.

FIG. 3 illustrates an example of an emergency situation where two vehicles may collide into one another. Referring to FIG. 3, the leading vehicle 302 and the following vehicle 304 are traveling in the same direction in the same lane. When the leading vehicle 302 detects a road hazard or obstacle 310, the leading vehicle 302 performs an emergency braking maneuver to avoid or reduce the impact of colliding with the road hazard or obstacle 310. If the leading vehicle 302 is not a safety driving model compliant vehicle, the emergency braking maneuver can involve applying a deceleration or braking acceleration that exceeds the safety driving model defined maximum braking acceleration. The following vehicle 304 may be a safety driving model compliant vehicle that is unable recognize this emergency situation. For example, the safety driving model compliant vehicle may not be able to anticipate the application of a braking acceleration that exceeds the safety driving model maximum braking acceleration in a timely manner. The following vehicle 304 only anticipates the leading vehicle 302 applying the safety driving model maximum braking acceleration. As a result, the following vehicle 304 may only apply the safety driving model limited maximum braking acceleration initially, which may be insufficient to avoid a collision with the leading vehicle 302. Alternatively, the following vehicle 304 is a safety driving model compliant vehicle that is able to recognize the insufficiency of applying the safety driving model maximum braking acceleration and applies the maximum physical deceleration or braking acceleration as default. In the latter case, the maximum physical deceleration or braking acceleration of the following vehicle 304 is sufficient to avoid collision but may be too abrupt and result in butterfly effects.

Figure 4:
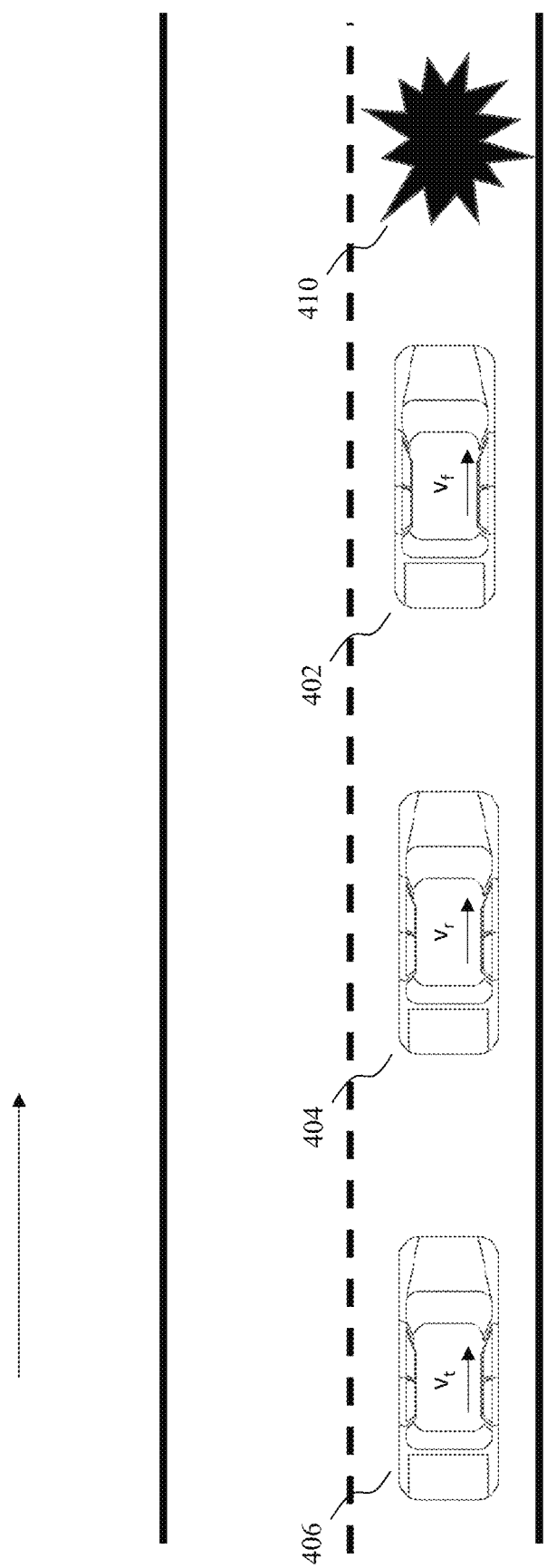
FIG. 4 illustrates an example of a chain reaction accident resulting from three or more vehicles crashing into one another in a series of rear-end collisions because the vehicles are unable to detect the emergency situation and react appropriately to avoid collisions with cars in front.
Figure 5:
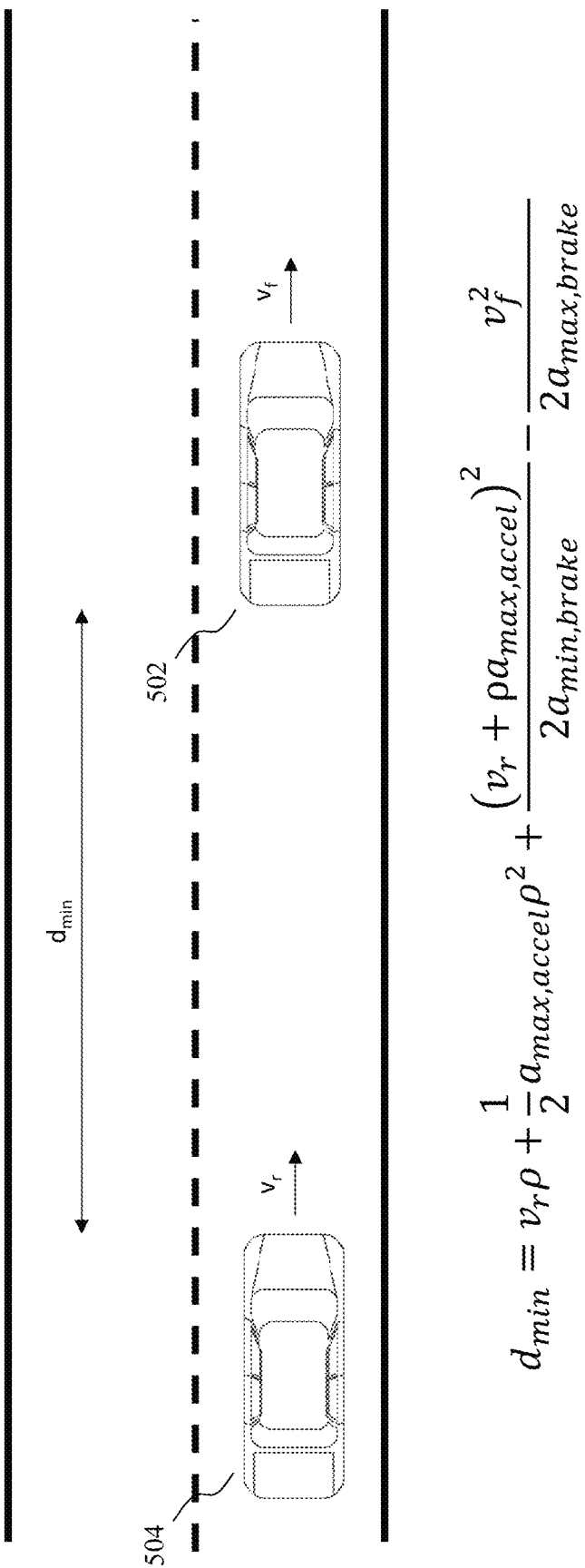
FIG. 5 illustrates an example of a longitudinal safety distance between a leading vehicle and a following vehicle.

FIG. 4 illustrates another example of an emergency situation where three or more vehicles collide into one another in a series of rear-end collisions, i.e., a chain reaction, arising from butterfly effects. Referring to FIG. 4, the leading vehicle 402, the following vehicle 404, and the trailing vehicle 406 are traveling in the same direction in the same lane. The leading vehicle 402 is a safety driving model compliant vehicle so the braking maneuver can involve applying insufficient deceleration or braking acceleration (i.e., the safety driving model limited maximum deceleration or braking acceleration) thereby causing a collision or applying too much deceleration or braking acceleration (i.e., the maximum physical deceleration or braking acceleration by default) thereby stopping short and causing the following vehicle 404 to collide into the leading vehicle 402 and the trailing vehicle 406 to collide into the following vehicle 404.

Figure 6B:
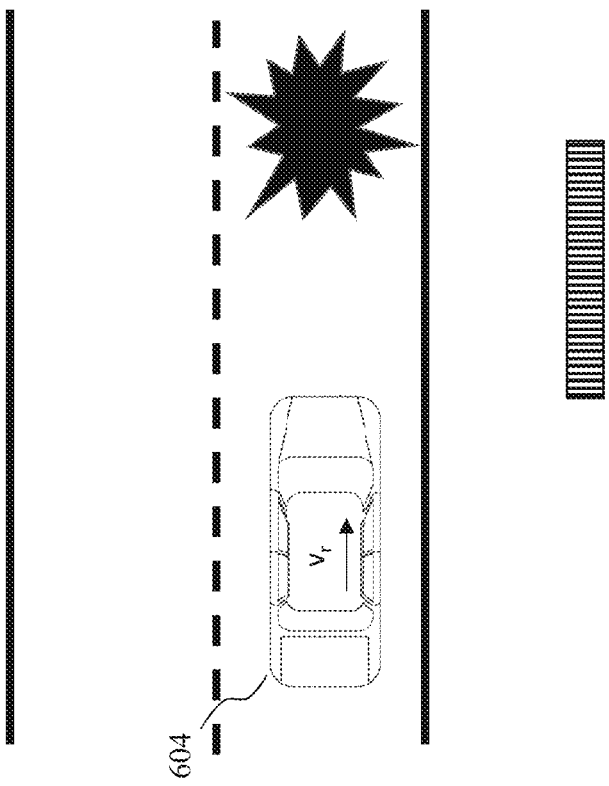
FIGS. 6A and 6B illustrate an example of a situation when a vehicle has to consider a road hazard or obstacle that suddenly appears.
Figure 6A:
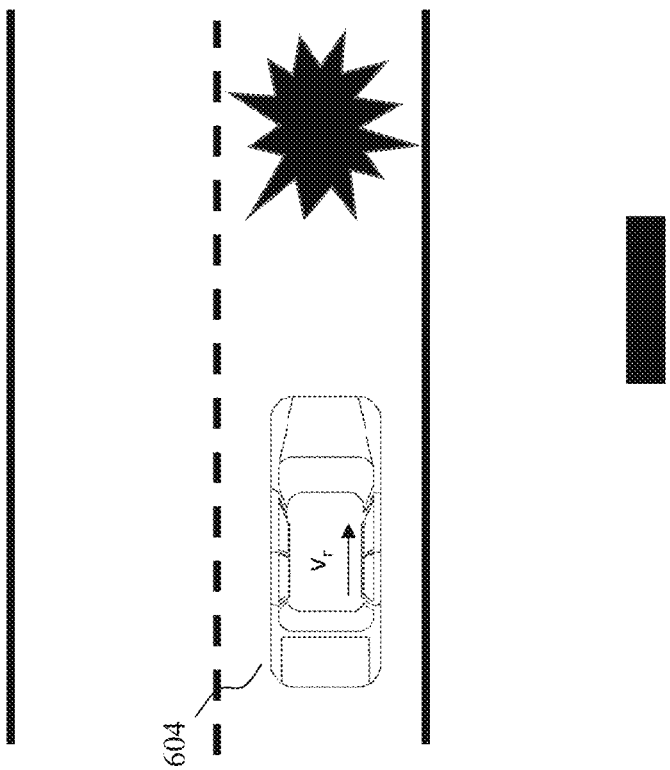

FIGS. 6A and 6B illustrate an example of a situation when a vehicle has to consider a road hazard or obstacle that suddenly appears. Without a safety driving model framework, the vehicle 602 applies the required deceleration, e.g., emergency braking acceleration (left). With a safety driving model framework the deceleration is limited by safety driving model rules (right). The resulting safety driving model limited maximum braking deceleration leads to a crash.

The safety driving model framework may not allow compliant vehicles to brake with the maximum necessary force in a timely manner. Therefore, a safety driving model compliant vehicle might cause accidents that could have been avoided.

The present disclosure provides an extension to a conventional safety driving model framework for longitudinal safety distances and braking that allows application of a maximum required deceleration or braking acceleration and still guarantee the safety driving model claim of not causing an accident. The extension provides improved parameter calculation in critical situations. A critical situation is an unsafe situation for which the correct response would not be possible under the current safety driving model parametrization. The extension prevents or reduces the impact of collisions that would occur if a vehicle complied with the safety driving model framework.

For example, an emergency braking situation arises when a safety driving model compliant ego vehicle determines that the maximum deceleration or braking acceleration as defined by the safety driving model parameter set is not sufficient to maintain a safe distance to a leading vehicle or object in the path of travel and the safety driving model compliant ego vehicle also determines that an evasive maneuver is not desirable because it would put other road agents at risk.

An emergency braking situation may be caused by various reasons. For example, one or more other road agents cutting into the lane of the ego vehicle, static objects like debris or cargo that fall on the road, road hazards like potholes, sensor errors of the ego vehicle that erroneously suggest a safe distance are corrected at a later stage (e.g., by a complementary or back up sensor), or a sudden change in environmental conditions that indicate a dangerous situation (e.g., another vehicle entering or leaving a dense fog bank).

In such critical situations, the deceleration has to be increased beyond the safety driving model defined maximum deceleration to avoid a crash of the ego-vehicle. This modification should be temporary and should only be in effect as long as the critical situation persists. At the same time, the risk for other road agents should be minimized. For example, braking parameters should be calculated and adapted to appropriately account for the emergency situation but at the same time fall short of the maximum possible physical deceleration or braking acceleration of the ego vehicle to minimize the risk to other road agents.

Figure 2:
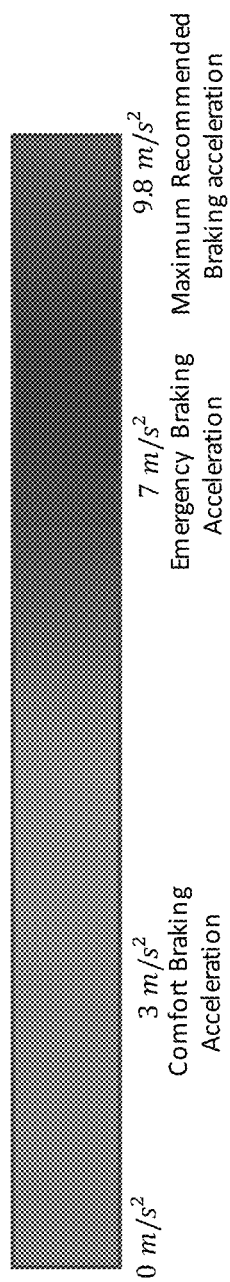
FIG. 2 illustrates a range of deceleration values for normal (standard) braking maneuvers and emergency braking maneuvers.

The extended safety driving model framework defines parameters for maximum and minimum deceleration or braking acceleration. Although a range of deceleration or braking acceleration can be selected, not all values should be used. The limits may be determined or regulated according to what is recommended for a human being. FIG. 2 illustrates an example range of parameters for deceleration or braking acceleration. Specifically, FIG. 2 illustrates a range of deceleration values for standard braking maneuvers and emergency braking maneuvers. Referring to FIG. 2, the range between 3 and 7 meters per second square is the recommended range of deceleration values for human beings and any deceleration value greater than 9.8 meters per second square should be avoided as it is near the limit of what is recommended for the human body. The importance of this parametrization becomes apparent when the parameters are applied to an equation to compute the distance that a moving vehicle requires in order to go from an initial velocity to a complete stand stop.

The extended safety driving model framework may provide at least two braking profiles. For example, a normal or average braking profile may be provided for normal driving situations and an emergency braking profile may be provided for emergency driving situations. In some cases, an additional comfort braking profile may be provided for normal driving situations. Each braking profile includes a set of parameters that define braking performance. For example, each braking profile may include a minimum safety distance, a minimum deceleration, a maximum deceleration, a response time.

Figure 7:
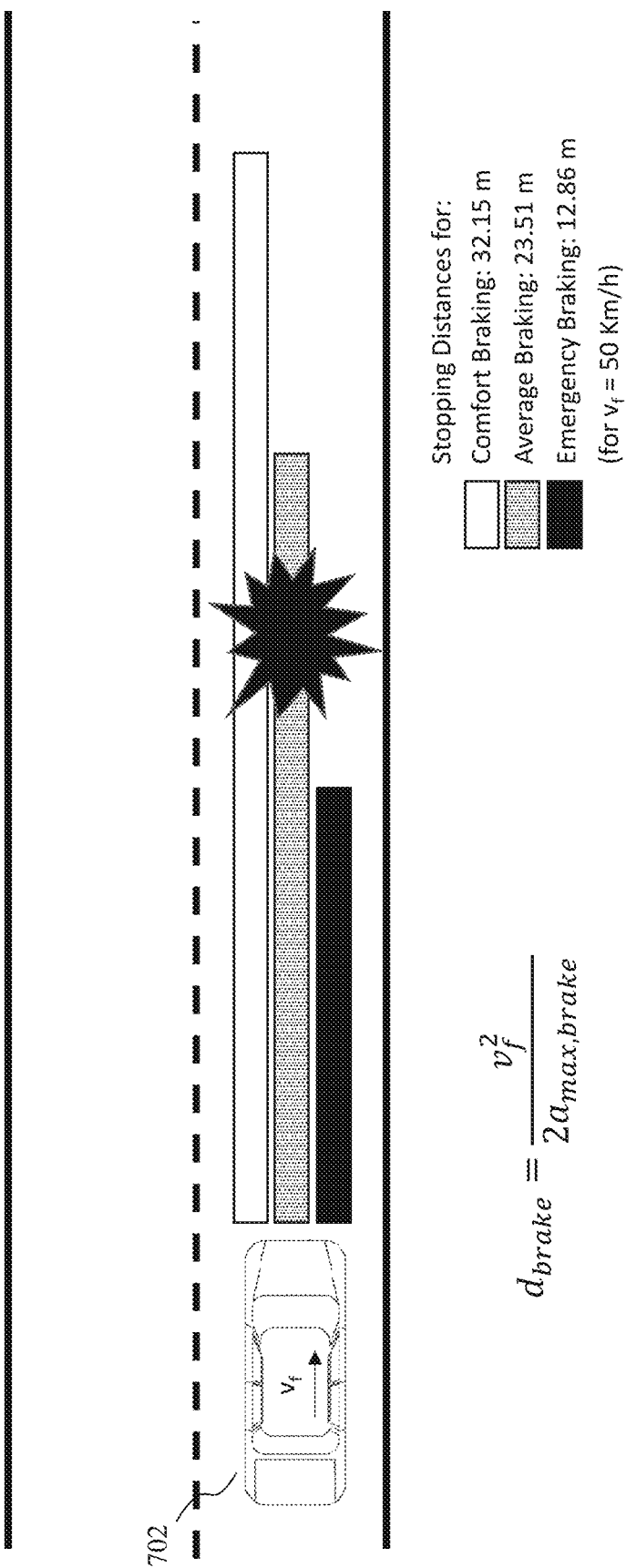
FIG. 7 is a diagram illustrating examples of braking distances associated with different braking profiles.

FIG. 7 is a diagram illustrating examples of braking distances associated with different braking profiles. FIG. 7 provides examples of stopping distances associated with different braking profiles. The parameters for the comfort braking profile and the emergency braking profile describe the minimum and maximum values that the deceleration can take at any given moment. By using the recommended ranges of deceleration values as shown in FIG. 2, it is possible to compute different safety distances that should be enforced in order to avoid collisions in normal and emergency situations.

Figure 8:
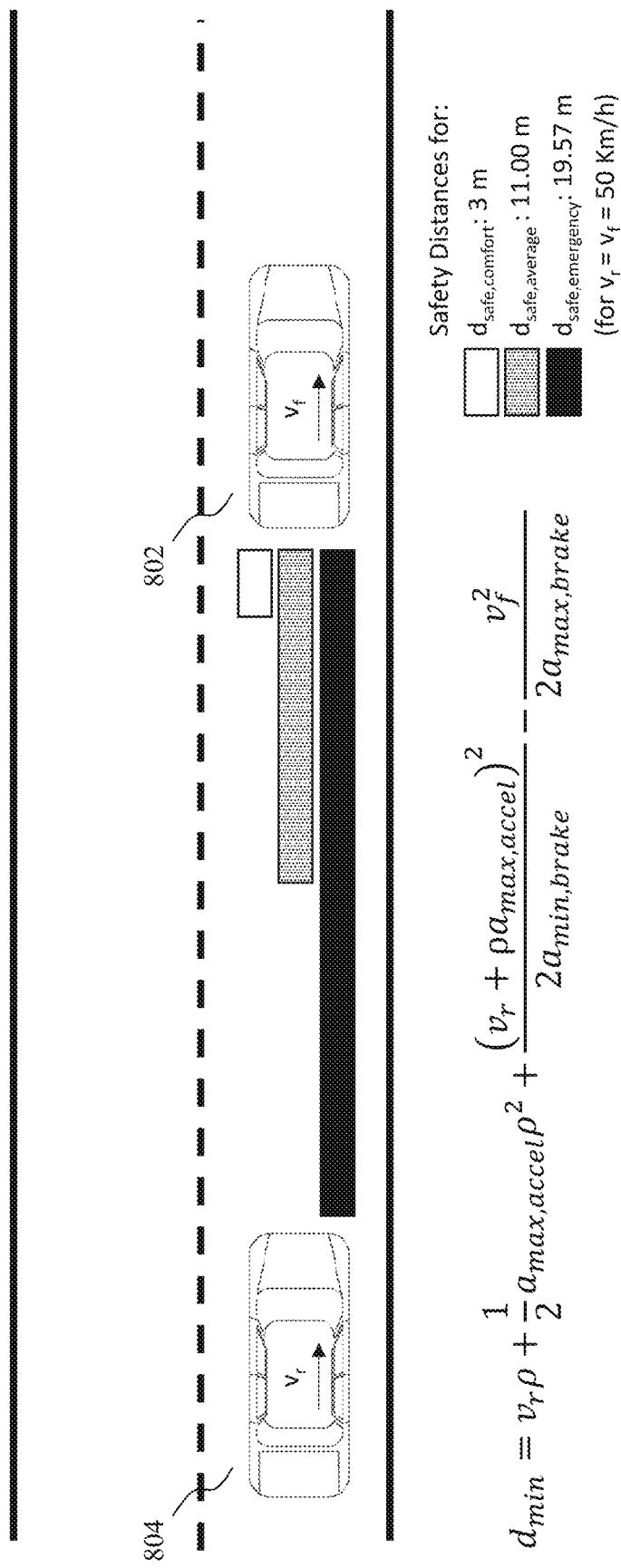
FIG. 8 is a diagram illustrating examples of safe distances as a function of the maximum braking acceleration.

FIG. 8 is a diagram illustrating examples of safety distances as a function of the maximum braking acceleration for two vehicles driving at 50 Km/h as shown in FIG. 7. FIG. 8 shows how much the safety distances can vary as a function of the expected maximum braking acceleration applied by the leading vehicle.

Under the safety driving model framework, a normal safety distance generally ensures that the autonomous vehicle does not cause an accident. However, there are situations where the safety driving model framework is not sufficient and may cause an accident. For example, if a leading vehicle applies a braking acceleration that is greater than the estimates derived from the parameters of the model, then the inductive proof given on the document will be no longer be valid which as a consequence creates the conditions for an accident to happen. This scenario is illustrated in FIG. 7 which shows vehicle reactions to a fallen obstacle on the road. Based on the velocity of the autonomous vehicle and the distance from the autonomous vehicle to the obstacle, it becomes evident that if a normal braking response were to be applied the collision will not be avoided. In such circumstance, only an emergency braking response may avoid a collision. The safety driving model safety distance calculation, e.g., $d_{safe,average}$, would be invalid in such circumstance for the autonomous vehicle and/or a following safety driving model compliant vehicle.

FIG. 7 illustrates a critical scenario where use of a comfort braking profile and an average (normal) braking profile would not be able to avoid a collision. In such a critical scenario, only use of an emergency braking maneuver would avoid the collision. A safety driving model framework should not force a vehicle to crash in such situations. An autonomous vehicle should be able to apply a braking acceleration up to the maximum physical braking acceleration when required to prevent a collision. However, under a conventional safety driving model framework, this would require setting the maximum deceleration to the maximum possible physical parameter. This is not desirable as it would either lead to higher safety distances that would decrease road utilization. Alternatively, another option would be to increase the minimum braking acceleration, but this is also not desirable as it would require the safety driving model compliant vehicle to apply a stronger braking response even in normal situations and lead to an uncomfortable driving style which may cause motion sickness.

Similarly, simply allowing a safety driving model compliant vehicle to brake harder in an emergency situation than what the safety driving model framework would allow is not a completely safe solution. This may prevent a collision between the safety driving model compliant vehicle and an obstacle or a leading vehicle, but another safety driving model compliant vehicle that is travelling behind at a safe distance under the safety driving model framework would nonetheless crash into the leading safety driving model compliant vehicle when the leading safety driving model compliant vehicle brakes at the maximum physical braking acceleration. This is mainly due to the fact, that the following safety driving model compliant vehicle needs some reaction time to detect that the vehicle in front is braking and that the following safety driving model compliant vehicle might not brake with maximum physical braking acceleration, because the following vehicle is not yet aware that the leading safety driving model compliant vehicle is braking harder than usual.

In order to solve these issues, the conventional safety driving model framework may be extended to include multiple braking profiles that can be dynamically adopted based on the detected braking situation. The extended safety driving model framework may define a normal safety distance and an emergency safety distance.

Accordingly, an extended safety driving model framework would provide a detection and handling mechanism for extreme emergency longitudinal breaking. Under an extended safety driving model framework as described in the present disclosure, an autonomous vehicle 100 performs a detection classification between normal driving situations and emergency (dangerous) driving situations to determine when maximum normal braking acceleration is sufficient and when emergency braking acceleration is necessary. The detection and handling mechanism should also handle chain emergency braking reactions.

Multiple safety driving model compliant cars have to detect an emergency situation and react appropriately to avoid collisions with cars in front performing emergency breaks.

The normal safety distance may be $d_{min}$ as described with respect to Eq. (1). The emergency safety distance may be determined based on an emergency response time and maximum braking capabilities of a vehicle. For example, an extended safety driving model framework may include the following parameters for emergency braking situations: $\rho_{emergency}$, $a_{max,brake,physics}$, and $a_{emergency,brake}$. For example, the emergency safety distance $d_{emergency}$ may be determined based on $$d_{emergency} = v_r \rho_{emergency} + \frac{1}{2} a_{max,accel} \rho_{emergency}^2 + \frac{(v_r + \rho_{emergency} a_{max,accel})^2}{2 a_{emergency,brake}} - \frac{v_f^2}{2 a_{max,brake,physics}} \quad \text{Eq. (2)}$$

$\rho_{emergency}$ represents the emergency response time that a following vehicle requires to determine that a leading vehicle is braking with a deceleration higher than is allowed under a normal situation braking profile (e.g., higher than what safety driving model allows i.e, $a_{max,brake}$).

$a_{max,brake,physics}$ represents the maximum physical deceleration or braking acceleration that can occur in real driving situations. For example, $a_{max,brake,physics}$ may represent a maximum deceleration or braking acceleration that is physically possible for a vehicle.

$a_{emergency,brake}$ represents the emergency deceleration or braking acceleration that a vehicle applies in emergency situations. For example, $a_{emergency,brake}$ may represent a deceleration or braking acceleration that a vehicle can apply without loss of navigational control. This could be lower than the maximum physically possible deceleration.

The emergency response time $\rho_{emergency}$ may be greater than the nominal response time $\rho$, i.e. $\rho_{emergency} \geq \rho$. The nominal response time $\rho$ is the time an autonomous vehicle requires to detect that an emergency situation is happening. In an emergency situation, more time may be required to determine a desired braking acceleration and to ensure that it is correctly applied. For example, more time may be required to detect and safely classify an emergency braking situation.

Under the extended safety driving model framework, $$|a_{max,brake,physics}| \geq |a_{emergency,brake}| \geq |a_{max,brake}|$$

$a_{max,brake}$ represents the maximum deceleration or braking acceleration that is allowed under the safety driving model framework for normal situations. When an emergency situation is detected, a vehicle under the extended safety driving model framework will transition from a normal braking state to an emergency braking state. During an emergency situation, the emergency braking state allows safety distances (i.e., separation distances) that are shorter than the safety distance under a normal braking state. The emergency braking state also increases the constraints imposed on the deceleration of the autonomous vehicles. For example, the emergency state may enforce a deceleration that is at least $a_{max,brake}$.

Under the extended safety driving model framework, the promise of safe driving is maintained, because it is possible to apply a variable braking acceleration ranging from $a_{max,brake}$ up to $a_{max,brake,physics}$ dynamically in emergency situations. Referring to FIG. 3, the situation defined in FIG. 3 will have as a final consequence the full stop of the autonomous vehicle, with a distance d(vehicle$_1$,vehicle$_2$) between a leading vehicle (vehicle$_1$) 302 and a following vehicle (vehicle$_2$) 304 greater than zero at all times. The desired final distance may be as defined by the safety driving model framework, so that d(vehicle$_1$,vehicle$_2$)>0.

Figure 9:
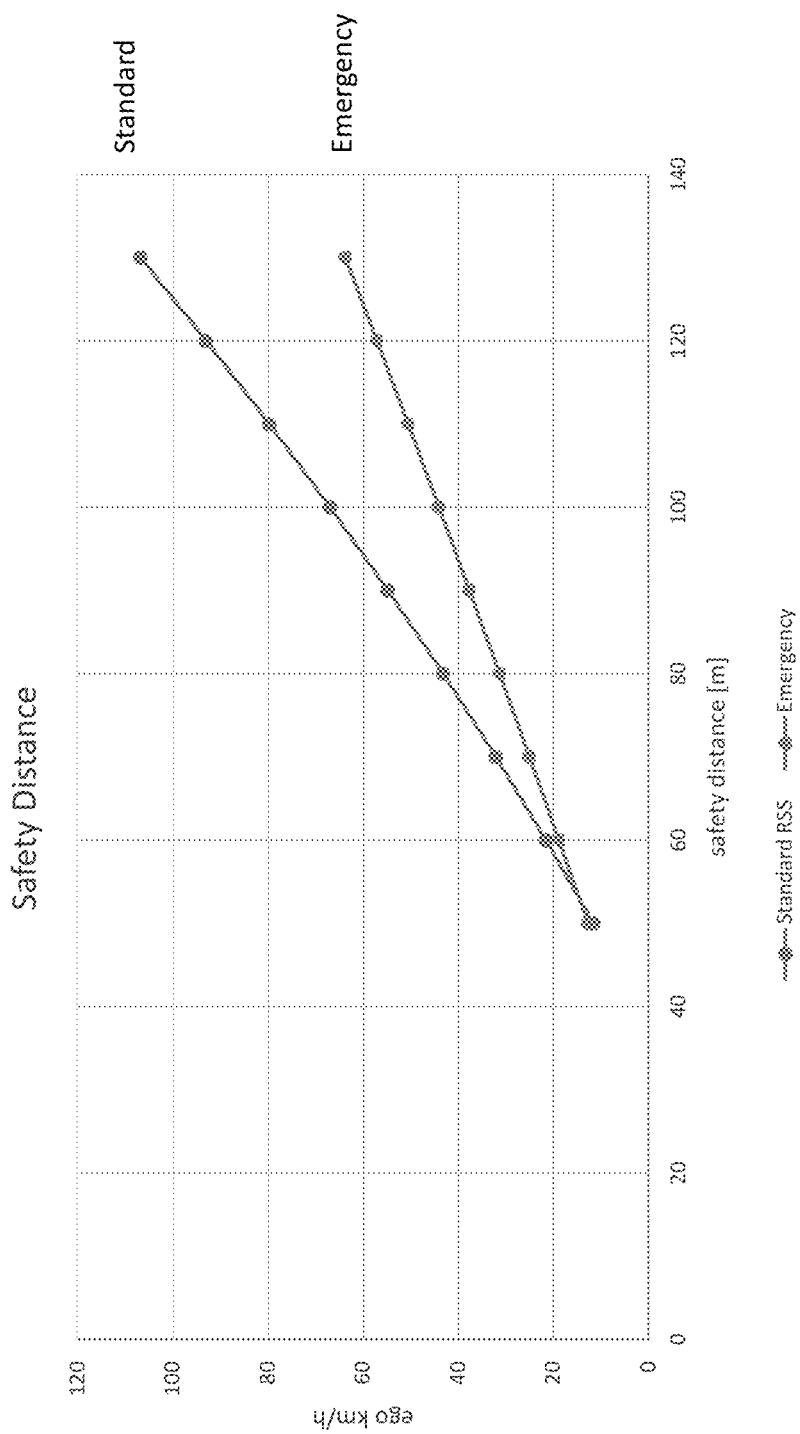
FIG. 9 is a graph illustrating the recommended safety distances between a leading vehicle and a following vehicle for different traveling velocities of the following vehicle.

FIG. 9 is a graph illustrating the recommended safety distances between a leading vehicle and a following vehicle for different traveling velocities of the following vehicle. Referring to FIG. 9, when a following vehicle is traveling at 80 km/h, the emergency response time and the nominal response time are the same (e.g., $\rho=\rho_{emergency}=2$ s), the minimum normal deceleration or braking acceleration is 3 ms$^{-2}$ (e.g., brake$_{min}=3$ m/s$^2$), the maximum normal deceleration or braking acceleration is 7 ms$^{-2}$ (e.g., brake$_{max}=7$ m/s$^2$), the emergency deceleration or braking acceleration is 9 ms$^{-2}$ (e.g., brake$_{emergency}=9$ m/s$^2$), and the maximum physically possible deceleration or braking acceleration is 12 ms$^{-2}$ (e.g., brake$_{max\_physics}=12$ m/s$^2$). With reference to the exemplary parameter selection of FIG. 9, the safety distance of the emergency braking does not increase the required overall safety distance. As a consequence, the use of a normal braking profile and an emergency braking profile provides additional safety without the need of increasing the normal safety distance.

One parameter of the new emergency safety distance is the emergency response time, $\rho_{emergency}$. The AV 100 is equipped with sensors 112 (e.g., radar, distance sensor) that can be used to determine an acceleration of a leading vehicle over time. For example, a radar may provide an estimated or inferred velocity of a leading vehicle. A controller 114 may further process the estimated speeds from at least two different times to obtain an acceleration over time. For example, a distance sensor may provide an estimated distance to a leading vehicle. A controller 114 may further process the estimated distances from at least three different times to obtain an acceleration over time. The obtained acceleration estimate will indicate whether a leading vehicle is accelerating to increase velocity, decelerating to decrease velocity, or maintaining speed.

In order to help a vehicle to more timely detect that another vehicle is applying emergency braking, it is desirable that a leading vehicle also informs a following vehicle that the leading vehicle is performing an emergency braking maneuver. If both vehicles are equipped with V2V communication this information can be easily be shared with a predetermined message.

When V2V communication is not available, a leading vehicle may provide an optical indication to a following vehicle. This could be e.g. optical information, like flashing of emergency lights or brake lights, or the use of predetermined LIDAR or RADAR beacons that can be easily detected by the following vehicle. If the following vehicle detects these emergency indications or signals, the following vehicle can itself brake with emergency braking acceleration sooner. This may further avoid a collision or at least decrease the impact.

To avoid unnecessarily strong deceleration even during an emergency situation, the applied braking acceleration may be variable or dynamically applied. For example, the applied braking acceleration in an emergency state may be limited to the maximum required braking acceleration necessary for the situation. This can be calculated based on the distance between the two vehicles applying braking maneuvers, the leading or frontal vehicle with velocity $v_f$ and with deceleration $a_f$ and the following or rear vehicle with velocity $v_r$ and deceleration $a_r$, and an initial separation distance of $d_0$ is represented by $$d(v_r, v_f, a_r, a_f, d_0) = d_0 - \frac{v_r^2}{2a_r} + \frac{v_f^2}{2a_f} \quad \text{Eq. (3)}$$

A condition for safety is that the distance between the two vehicles remains greater than zero at any given time. Accordingly, determining the maximum required deceleration or braking acceleration needed in an emergency response can be formulated as an optimization problem by using $$a_{emergency} = \min_{a} \arg a^2$$

subject to $$d(v_r, v_f, a_r, a_f, d_0) \geq 0, a_{emergency} \geq a \geq a_{comfort}$$

These constraints guarantee that collision avoidance is ensured, and that the acceleration is kept according to the car dynamic parameters. If no solution is found it would mean that a collision is unavoidable even by applying an emergency braking maneuver. A solution to this problem can be expressed as:

$$d(v_r, v_f, a_r, a_f, d_0) = d_0 - \frac{v_r^2}{2a_r} + \frac{v_f^2}{2a_f} \geq 0, \quad \text{Eq. (4)}$$

$$a_f \geq 0, a_r \geq 0$$

If $a_f$ is known, (e.g., the braking acceleration of the leading vehicle can be determined or estimated by the following vehicle), then:

$$a_r\left(d_0 + \frac{v_f^2}{2a_f}\right) \geq \frac{v_r^2}{2} \quad \text{Eq. (5)}$$

which corresponds to a minimum bound for the emergency braking acceleration so that $$a_r \geq \frac{v_r^2 a_f}{2a_f d_0 + v_f^2}, a_{emergency,brake} \equiv a_r \quad \text{Eq. (6)}$$

In a situation where there is an obstacle or road hazard, the velocity and the acceleration of the leading vehicle in Eqs. (3)-(5) may be set to zero.

For a non-critical situation, the bounds on the acceleration are therefore, $$|a_{max,brake,physics}| \geq |a_{RSS}| \geq |a_{comfort}| \geq 0$$

And for a critical emergency-brake situation, an emergency braking acceleration that is larger or equal to the admissible acceleration as defined by safety driving model $a_{RSS}$ $$|a_{max,brake,physics}| \geq |a_{emergency,brake}| \geq |a_{RSS}| \geq |a_{comfort}| \geq 0.$$

Figure 10:
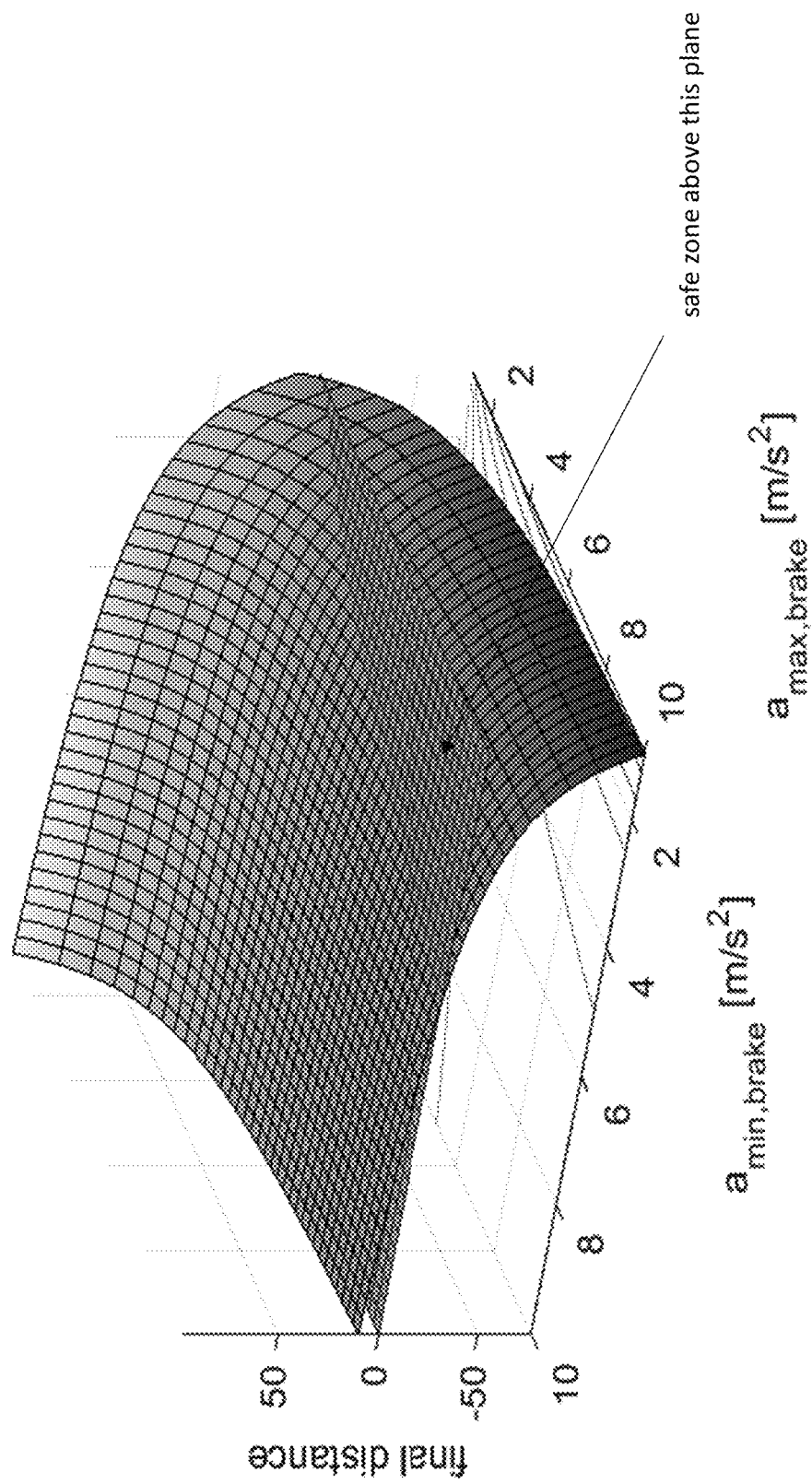
FIG. 10 is a 3D graph illustrating hard constraints imposed on the parameters to reduce the area in which a correct response that avoids a collision (above the plane extending from the zero marking on the final distance axis).

FIG. 10 is a 3D graph illustrating hard constraints imposed on the parameters to reduce the area in which a correct response that avoids a collision (above the plane extending from the zero marking on the final distance axis). By relaxing the constraints, an adequate response is always available.

Figure 11:
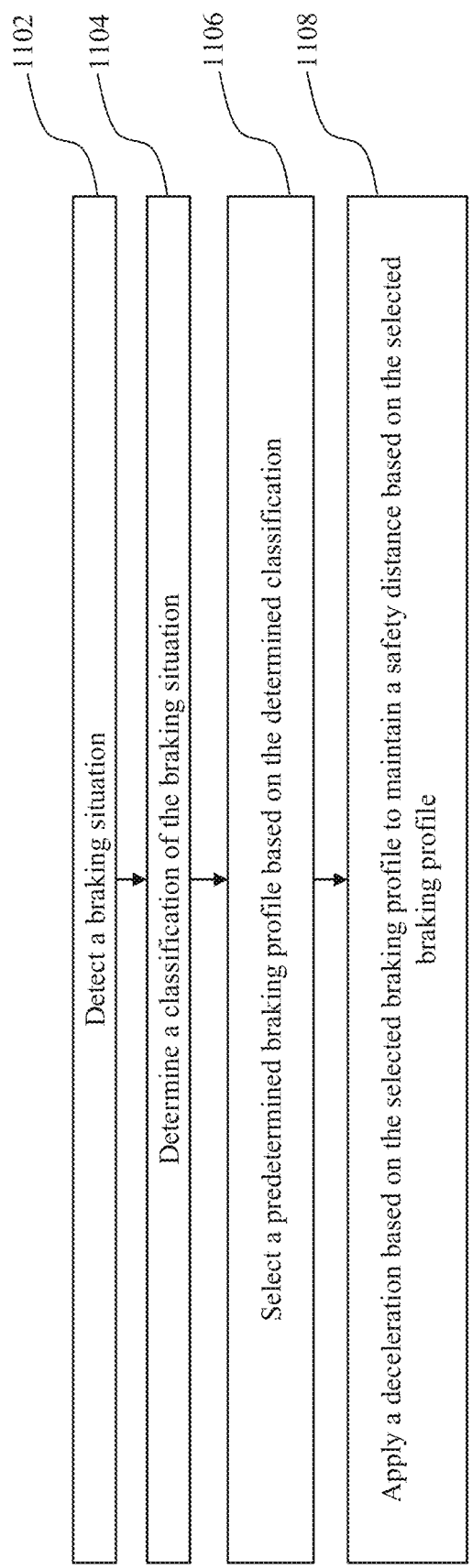
FIG. 11 illustrates a flowchart of a method for controlling a braking of a vehicle according to various aspects of the present disclosure.

FIG. 11 illustrates a flowchart of a method for controlling a braking of a vehicle according to various aspects of the present disclosure.

At 1102, a control system may detect a braking situation. For example, a controller 114 may determine that there is a braking situation based on information provided by sensors 112. The controller 114 may determine that a leading vehicle is decelerating because the information provided by the sensors indicate that the leading vehicle is reducing speed or the distance between the ego vehicle and the leading vehicle is decreasing. A braking situation may be detected if the estimated deceleration of the leading vehicle exceeds a predetermined braking threshold. The controller may determine that an obstacle is present because the cameras or distance sensors indicate a proximate object.

At 1104, a control system determines a classification of the braking situation. For example, a control system may determine whether a braking situation is a normal braking situation or an emergency braking situation based on the deceleration rate. An emergency braking situation may be detected if the estimated deceleration of the leading vehicle exceeds a predetermined emergency braking threshold.

At 1106, a control system may select a one of a plurality of predetermined braking profiles based on the determined classification. For example, there may be a normal braking profile for normal driving situations and an emergency braking profile for emergency situations. Each braking profile may include a safety distance and a minimum and maximum braking accelerations. To provide a smooth transition, the minimum braking acceleration of the emergency braking profile may be the maximum braking acceleration of the normal braking profile. The safety distance of the emergency braking profile may be less than the safety distance of the normal braking profile.

At 1108, a control system may apply a deceleration based on the selected braking profile to maintain a safety distance based on the selected braking profile. The control system may dynamically change from the normal braking profile to the emergency braking profile when the braking situation is classified as the emergency braking situation and using the emergency braking profile only while the emergency braking situation persists; and apply the deceleration based on the emergency braking profile. In an emergency situation, the applied deceleration may vary from the maximum braking acceleration of the normal braking profile up to the maximum braking acceleration of the emergency braking profile. The applied deceleration is determined so that the distance between the ego vehicle and the leading vehicle (or object or road hazard) is always greater than zero.

In the following, various aspects of this disclosure will be illustrated:

Example 1 is a method for a safety system of a vehicle. The method may include controlling a braking of a vehicle by detecting a braking situation, determining a classification of the braking situation, selecting a braking profile based on the determined classification, and applying a deceleration based on the selected braking profile to maintain a safety distance based on the selected braking profile.

In Example 2, the subject-matter of Example 1, can optionally include wherein the classification includes a normal braking situation and an emergency braking situation, wherein a normal braking profile corresponding to the normal braking situation includes a minimum normal deceleration and maximum normal deceleration, wherein an emergency braking profile corresponding to the emergency braking situation includes a minimum emergency deceleration and a maximum emergency deceleration, wherein the vehicle has a maximum physical deceleration, and wherein the maximum physical deceleration is greater than or equal to the maximum emergency deceleration and the maximum emergency deceleration is greater than the maximum normal deceleration.

In Example 3, the subject-matter of Examples 1 or 2, can optionally include wherein the maximum emergency deceleration is less than the maximum physical deceleration of the vehicle.

In Example 4, the subject-matter of Examples 1 or 2, can optionally include dynamically changing from the normal braking profile to the emergency braking profile when the braking situation is classified as the emergency braking situation and using the emergency braking profile only while the emergency braking situation persists, and applying the deceleration based on the emergency braking profile.

In Example 5, the subject-matter of Examples 1 or 2, can optionally include wherein a safety distance associated with the normal braking profile is greater than a safety distance associated with the emergency braking profile.

In Example 6, the subject-matter of Examples 1 or 2, can optionally include wherein a safety distance associated with the emergency braking profile, $d_{emergency}$, is determined by $$d_{emergency} = v_r \rho_{emergency} + \frac{1}{2} a_{max,accel} \rho_{emergency}^2 + \frac{(v_r + \rho_{emergency} a_{max,accel})^2}{2 a_{emergency,brake}} - \frac{v_f^2}{2 a_{max,brake,physics}}$$

where $\rho_{emergency}$ is an emergency response time, $a_{max,brake,physics}$ is a maximum physical braking acceleration of the vehicle, $a_{emergency,brake}$ is an emergency braking acceleration, and $a_{max,accel}$ is a maximum acceleration of the vehicle.

In Example 7, the subject-matter of any of Examples 1-4 can optionally include wherein the deceleration $a_r$ is between the minimum emergency deceleration and a maximum emergency deceleration.

In Example 8, the subject-matter of Example 7 can optionally include wherein the deceleration $a_r$ is dynamically determined based on $$a_r \geq \frac{v_r^2 a_f}{2 a_f d_0 + v_f^2}, \ a_{emergency,brake} \equiv a_r$$

where $d_0$ is an initial separation distance between the vehicle and a leading vehicle applying deceleration $a_f$, $v_f$ is a velocity of the leading vehicle, and $v_r$ is a velocity of the vehicle.

Example 9 is a system for a safety system of a vehicle. The system may control a braking of a vehicle and include one or more sensors configured to detect a braking situation, one or more processors configured to determine a classification of the braking situation, select a braking profile based on the determined classification, and apply a deceleration based on the selected braking profile to maintain a safety distance based on the selected braking profile.

In Example 10, the subject-matter of Example 9 can optionally include wherein the classification includes a normal braking situation and an emergency braking situation, wherein a normal braking profile corresponding to the normal braking situation includes a minimum normal deceleration and maximum normal deceleration, wherein an emergency braking profile corresponding to the emergency braking situation includes a minimum emergency deceleration and a maximum emergency deceleration, wherein the vehicle has a maximum physical deceleration, and wherein the maximum physical deceleration is greater than or equal to the maximum emergency deceleration and the maximum emergency deceleration is greater than the maximum normal deceleration.

In Example 11, the subject-matter of Examples 9 or 10, can optionally include wherein the maximum emergency deceleration is less than the maximum physical deceleration of the vehicle.

In Example 12, the subject-matter of Examples 9 or 10, can optionally include wherein the one or more processors are further configured to dynamically change from the normal braking profile to the emergency braking profile when the braking situation is classified as the emergency braking situation and use the emergency braking profile only while the emergency braking situation persists; and apply the deceleration based on the emergency braking profile.

In Example 13, the subject-matter of Examples 9 or 10, can optionally include wherein a safety distance associated with the normal braking profile is greater than a safety distance associated with the emergency braking profile.

In Example 14, the subject-matter of Examples 9 or 10, can optionally include wherein a safety distance associated with the emergency braking profile, $d_{emergency}$, is determined by $$d_{emergency} = v_r \rho_{emergency} + \frac{1}{2} a_{max,accel} \rho_{emergency}^2 + \frac{(v_r + \rho_{emergency} a_{max,accel})^2}{2 a_{emergency,brake}} - \frac{v_f^2}{2 a_{max,brake,physics}}$$

where $\rho_{emergency}$ is an emergency response time, $a_{max,brake,physics}$ is a maximum physical braking acceleration of the vehicle, $a_{emergency,brake}$ is an emergency braking acceleration, and $a_{max,accel}$ is a maximum acceleration of the vehicle.

In Example 15, the subject-matter of Example 11, can optionally include wherein the deceleration $a_r$ is between the minimum emergency deceleration and a maximum emergency deceleration.

In Example 16, the subject-matter of Example 15, can optionally include wherein the deceleration $a_r$ is determined based on $$a_r \geq \frac{v_r^2 a_f}{2 a_f d_0 + v_f^2}, a_{emergency,brake} \equiv a_r$$

where $d_0$ is an initial separation distance between the vehicle and a leading vehicle applying deceleration $a_f$, $v_f$ is a velocity of the leading vehicle, and $v_r$ is a velocity of the vehicle.

Example 17 is a machine-readable medium including instructions for a safety system of a vehicle. The instructions may control a braking of a vehicle according to various aspects of the present disclosure and cause a vehicle to perform operations including detecting a braking situation, determining a classification of the braking situation, selecting a braking profile based on the determined classification, and applying a deceleration based on the selected braking profile to maintain a safety distance based on the selected braking profile.

Example 18 is a vehicle, including a braking system, one or more sensors configured to detect a braking situation, one or more processors configured to determine a classification of the braking situation based on information provided the one or more sensors, select a braking profile based on the determined classification, and provide the selected braking profile to the braking system, wherein the braking system is configured to apply a deceleration based on the selected braking profile to maintain a safety distance based on the selected braking profile.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for controlling a braking of a vehicle, the method comprising:
   detecting a braking situation;
   determining a classification of the braking situation;
   selecting a braking profile based on the determined classification, the braking profile selected from one of a normal braking profile and an emergency braking profile; and
   applying a deceleration based on the selected braking profile to maintain a safety distance based on the selected braking profile,
   wherein a safety distance associated with the normal braking profile is greater than a safety distance associated with the emergency braking profile,
   wherein the classification includes a normal braking situation and an emergency braking situation, wherein the normal braking profile corresponding to the normal braking situation comprises a minimum normal safety distance, a minimum normal deceleration, maximum normal deceleration, a normal response time, wherein the emergency braking profile corresponding to the emergency braking situation comprises a minimum emergency safety distance, a minimum emergency deceleration, a maximum emergency deceleration, and an emergency response time, wherein the vehicle has a maximum physical deceleration, and wherein the maximum physical deceleration is greater than or equal to the maximum emergency deceleration and the maximum emergency deceleration is greater than the maximum normal deceleration,
   wherein the minimum emergency safety distance is determined based on the emergency response time, a velocity of the vehicle, a velocity of the leading vehicle, the minimum emergency deceleration, the maximum emergency deceleration, and the maximum physical deceleration of the vehicle.

2. The method of claim 1, further comprising:
   dynamically changing from the normal braking profile to the emergency braking profile when the braking situation is classified as the emergency braking situation and using the emergency braking profile only while the emergency braking situation persists; and
   applying the deceleration based on the emergency braking profile.

3. The method of claim 1, wherein the safety distance associated with the emergency braking profile, $d_{emergency}$, is determined by $$d_{emergency} = v_r \rho_{emergency} + \frac{1}{2}a_{max,accel}\rho_{emergency}^2 + \frac{(v_r + \rho_{emergency}a_{max,accel})^2}{2a_{emergency,brake}} - \frac{v_f^2}{2a_{max,brake,physics}}$$

where $\rho_{emergency}$ is an emergency response time, $a_{max,brake,physics}$ is a maximum physical braking acceleration of the vehicle, $a_{emergency,brake}$ is an emergency braking acceleration, and $a_{max,accel}$ is a maximum acceleration of the vehicle.

4. The method of claim 1, wherein the maximum emergency deceleration is less than the maximum physical deceleration of the vehicle and wherein the deceleration $a_r$ is between the minimum emergency deceleration and the maximum emergency deceleration.

5. The method of claim 4, wherein the deceleration $a_r$ is determined based on $$a_r \geq \frac{v_r^2 a_f}{2a_f d_0 + v_f^2}, a_{emergency,brake} \equiv a_r$$

where $d_0$ is an initial separation distance between the vehicle and a leading vehicle applying deceleration $a_f$, $v_f$ is a velocity of the leading vehicle, and $v_r$ is a velocity of the vehicle.

6. A system for controlling a braking of a vehicle, the system comprising:
one or more sensors configured to detect a braking situation;
one or more processors configured to
determine a classification of the braking situation;
select a braking profile based on the determined classification, the braking profile selected from one of a normal braking profile and an emergency braking profile; and
apply a deceleration based on the selected braking profile to maintain a safety distance based on the selected braking profile,
wherein a safety distance associated with the normal braking profile is greater than a safety distance associated with the emergency braking profile,
wherein the classification includes a normal braking situation and an emergency braking situation, wherein the normal braking profile corresponding to the normal braking situation comprises a minimum normal deceleration and maximum normal deceleration, wherein the emergency braking profile corresponding to the emergency braking situation comprises a minimum emergency deceleration and a maximum emergency deceleration, wherein the vehicle has a maximum physical deceleration, and wherein the maximum physical deceleration is greater than or equal to the maximum emergency deceleration and the maximum emergency deceleration is greater than the maximum normal deceleration,
wherein the minimum emergency safety distance is determined based on the emergency response time, a velocity of the vehicle, a velocity of the leading vehicle, the minimum emergency deceleration, the maximum emergency deceleration, and the maximum physical deceleration of the vehicle.

7. The system of claim 6, wherein the one or more processors are further configured to dynamically change from the normal braking profile to the emergency braking profile when the braking situation is classified as the emergency braking situation and use the emergency braking profile only while the emergency braking situation persists; and apply the deceleration based on the emergency braking profile.

8. The system of claim 6, wherein the safety distance associated with the emergency braking profile, $d_{emergency}$, is determined by $$d_{emergency} = v_r \rho_{emergency} + \frac{1}{2}a_{max,accel}\rho_{emergency}^2 + \frac{(v_r + \rho_{emergency}a_{max,accel})^2}{2a_{emergency,brake}} - \frac{v_f^2}{2a_{max,brake,physics}}$$

where $\rho_{emergency}$ is an emergency response time, $a_{max,brake,physics}$ is a maximum physical braking acceleration of the vehicle, $a_{emergency,brake}$ is an emergency braking acceleration, and $a_{max,accel}$ is a maximum acceleration of the vehicle.

9. The system of claim 6, wherein the maximum emergency deceleration is less than the maximum physical deceleration of the vehicle and wherein the deceleration $a_r$ is between the minimum emergency deceleration and the maximum emergency deceleration.

10. The system of claim 9, wherein the deceleration $a_r$ is determined based on $$a_r \geq \frac{v_r^2 a_f}{2a_f d_0 + v_f^2}, a_{emergency,brake} \equiv a_r$$

where $d_0$ is an initial separation distance between the vehicle and a leading vehicle applying deceleration $a_f$, $v_f$ is a velocity of the leading vehicle, and $v_r$ is a velocity of the vehicle.

11. A vehicle, comprising:
a braking system;
one or more sensors configured to detect a braking situation;
one or more processors configured to
determine a classification of the braking situation based on information provided the one or more sensors;
select a braking profile based on the determined classification, the braking profile selected from one of a normal braking profile and an emergency braking profile; and
provide the selected braking profile to the braking system, wherein the braking system is configured to apply a deceleration based on the selected braking profile to maintain a safety distance based on the selected braking profile,
wherein a safety distance associated with the normal braking profile is greater than a safety distance associated with the emergency braking profile,
wherein the classification includes a normal braking situation and an emergency braking situation, wherein the normal braking profile corresponding to the normal braking situation comprises a minimum normal deceleration and maximum normal deceleration, wherein the emergency braking profile corresponding to the emergency braking situation comprises a minimum emergency deceleration and a maximum emergency deceleration, wherein the vehicle has a maximum physical deceleration, and wherein the maximum physical deceleration is greater than or equal to the maximum emergency deceleration and the maximum emergency deceleration is greater than the maximum normal deceleration, wherein the minimum emergency safety distance is determined based on the emergency response time, a velocity of the vehicle, a velocity of the leading vehicle, the minimum emergency deceleration, the maximum emergency deceleration, and the maximum physical deceleration of the vehicle.

12. The method of claim 2, further comprising:
dynamically changing from the emergency braking profile to the normal braking profile when the emergency braking situation ends; and
applying the deceleration based on the normal braking profile.

13. The method of claim 1, wherein applying a deceleration based on the emergency braking profile includes dynamically applying a range of deceleration between the minimum emergency deceleration and the maximum emergency deceleration.

14. The method of claim 13, wherein the deceleration is determined based on the distance between the vehicle and a leading vehicle, the difference in velocity between the vehicles, and the difference in acceleration between the vehicles.

15. The method of claim 1, wherein the emergency response time is a time that the vehicle requires to determine that a leading vehicle is braking with a deceleration higher than is allowed under the normal braking profile.

16. The method of claim 15, wherein the minimum normal safety distance is determined based on the normal response time, the velocity of the leading vehicle, the velocity of the vehicle, the minimum normal deceleration, the maximum normal deceleration, and the maximum physical deceleration.

17. The method of claim 16, wherein the emergency response time is greater than the normal response time.

18. The method of claim 1, wherein determining the classification of the braking situation is based on a predetermined message received from a leading vehicle.

19. The system of claim 6, wherein the emergency response time is a time that the vehicle requires to determine that a leading vehicle is braking with a deceleration higher than is allowed under the normal braking profile.

* * * * *